United States Patent
Yeh

(10) Patent No.: US 7,084,913 B2
(45) Date of Patent: Aug. 1, 2006

(54) PROCESSING METHOD OF IMAGE COMPENSATION FOR DIGITAL CAMERA

(75) Inventor: Chia-Yow Yeh, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 716 days.

(21) Appl. No.: 10/212,206

(22) Filed: Aug. 6, 2002

(65) Prior Publication Data

US 2003/0086009 A1    May 8, 2003

(30) Foreign Application Priority Data

Sep. 24, 2001   (TW) .............................. 90123467 A

(51) Int. Cl.
*H04N 9/64* (2006.01)

(52) U.S. Cl. ...................... 348/246; 348/280
(58) Field of Classification Search ................ 348/272, 348/273, 280, 246
See application file for complete search history.

(56) References Cited

U.S. PATENT DOCUMENTS

| 6,493,029 | B1* | 12/2002 | Denyer et al. | 348/236 |
| 6,806,902 | B1* | 10/2004 | Donovan | 348/246 |
| 6,900,836 | B1* | 5/2005 | Hamilton, Jr. | 348/241 |
| 6,933,971 | B1* | 8/2005 | Bezryadin | 348/280 |
| 2002/0158977 | A1* | 10/2002 | Hamilton, Jr. | 348/246 |
| 2002/0196354 | A1* | 12/2002 | Chang et al. | 348/246 |

* cited by examiner

*Primary Examiner*—Ngoc-Yen Vu
*Assistant Examiner*—Nicholas G. Giles
(74) *Attorney, Agent, or Firm*—Bacon & Thomas, PLLC

(57) ABSTRACT

A processing method of image compensation for digital camera, after the signal of a digital image is sensed by a proper charged coupled device (CCD), a color filter array displays this digital image in a sequence by array pattern according to the signal strength of basic color components. The color component compensation can be completed in coordination with the signal composition of the color components that are adjacent to a pixel needed to do color component compensation; enabling digital camera can completely and truly display the captured image picture.

38 Claims, 5 Drawing Sheets

PROCESSING METHOD OF IMAGE COMPENSATION FOR DIGITAL CAMERA

TECHNICAL FIELD

The present invention relates to a processing method of image compensation for digital camera, more particularly to a processing method that can do the compensation to the distortion and missing of image to obtain the truest image presentation through a proper pixel algorithm process.

DESCRIPTION OF THE PRIOR ARTS

The earliest image storage type for the camera has been improved and developed day by day after the camera was invented, and the image presentation is also progressed from the earliest black and white picture to the present color picture. As to the image processing method, only the analog signal storage mode can be done at the earlier time is promoted to the other choice of the digital signal type owing to the progress of the digital processor, this brings a more convenient image processing method to the present digitized society.

The appearance of the digital camera brings a brand new progress in image processing technology. Using traditional camera to take a real image can store the image in the picture, but it is not an only choice as before for the present digitized environment. In coordination with the appearance of the computer and other consumer products, the requirement of image digitization becomes more important gradually. And, how to make the effect of the image digitization to reach real circumstances reborn is a primary point of the present technology improvement.

As mentioned before, conventional digital image processing techniques have varies with various types of digital camera, one of them is a method that does proper processing algorithm in coordinate with proximal certain pixels through the signal strength of each basic color component constituted by pixels. Therefore, a different type of processing algorithm may cause a different result for digital image process.

Another conventional technique is to use a color filter array (CFA), an image can be detected to get a pixel constituted by three basic color components, which are red, green and blue by means of this color filter array so that a algorithm process can be done easily while a following digital image process is executing.

SUMMARY OF THE INVENTION

The primary objective of the present invention is to provide a processing method of image compensation for digital camera, after the signal of a digital image is sensed by a proper charged coupled device (CCD), a color filter array displays this digital image in a sequence by array pattern according to the signal strength of basic color components. But, the image pixel may not be able to be displayed truly due to the process distortion and pixel interlacing. The color component compensation can be completed in coordination with the signal composition of the color components that are adjacent to a pixel needed to do color component compensation; enabling digital camera can completely and truly display the captured image picture.

Another object of the present invention is to provide a processing method of image compensation for digital camera, utilized to display the image pixel, which is sensed by CCD, in a proper form by means of a CFA. CFA is a product produced through the technique displayed by a published patent invented by Bryce E. Bayer and authorized to Kodak company, the detail of Bayer's CFA will be described later. After the sensed image is displayed by means of the form of CFA, the proper processing algorithm can be done, we can process the basic color component composition contained in the pixel to be compensated through the compensation way to obtain the realest image.

DETAILED DESCRIPTION OF THE PRESENT INVENTION

Figure 1:
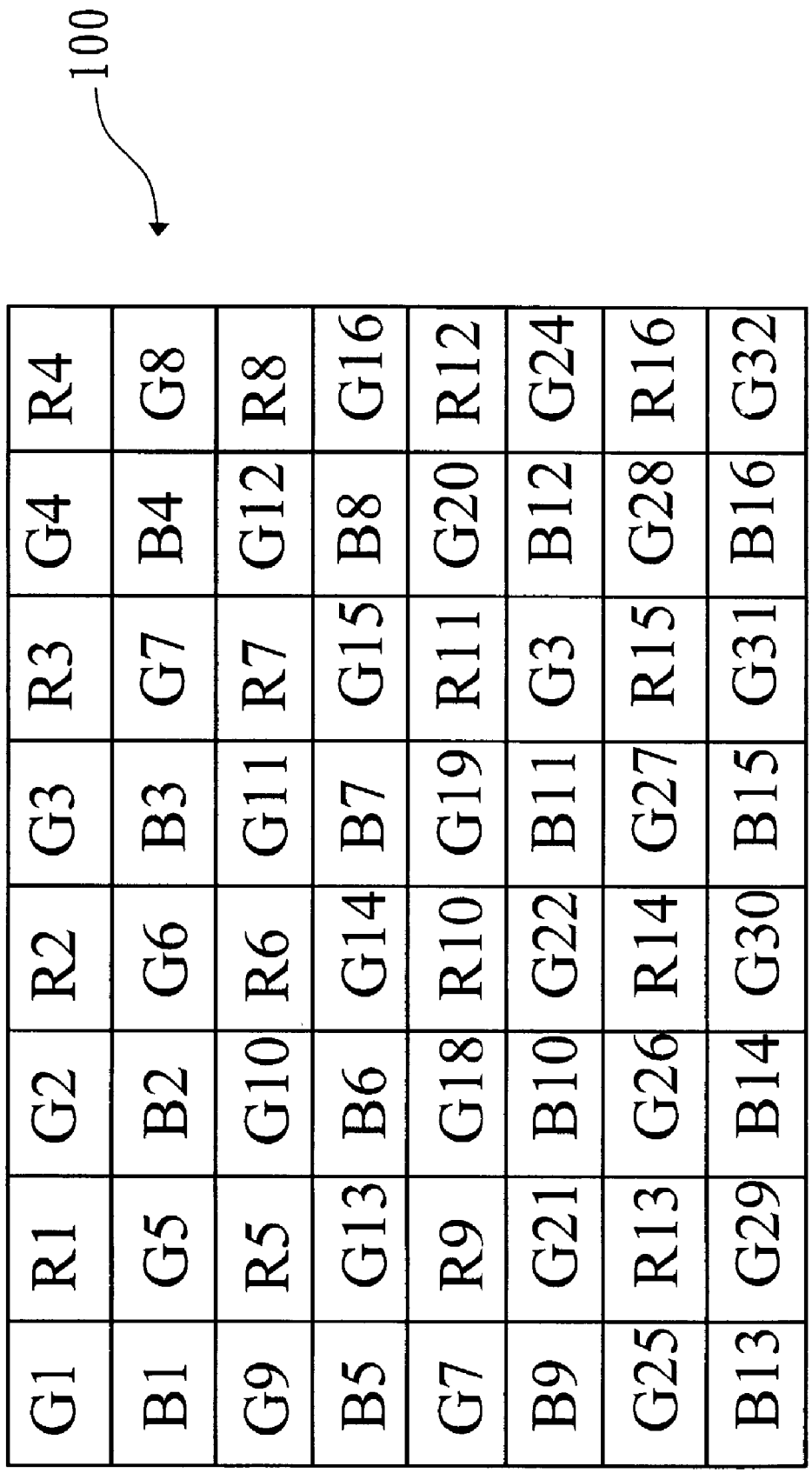
FIG. 1 is a block diagram of a preferred embodiment of the present invention, showing a blocks used in Bayer's CFA.

Pleased refer to FIG. 1, FIG. 1 is a block diagram for Bayer's color filter array (CFA). The present invention needs a color component sensing part for images capture. Here CFA 100 is used as an image color component sensor for the present invention. The CFA 100 consists of a plurality of green pixels (G), red pixels (R) and blue pixels (B), which are basic color components of an image. And, the green pixels are further arranged diagonally in CFA 100, as G1 and G5 shown in FIG. 1, while the red pixel and blue pixel (B) are arranged at another diagonal line relative to the diagonal line that the green pixel (G) is located, as R1 and B1 shown in FIG. 1.

Figure 2:
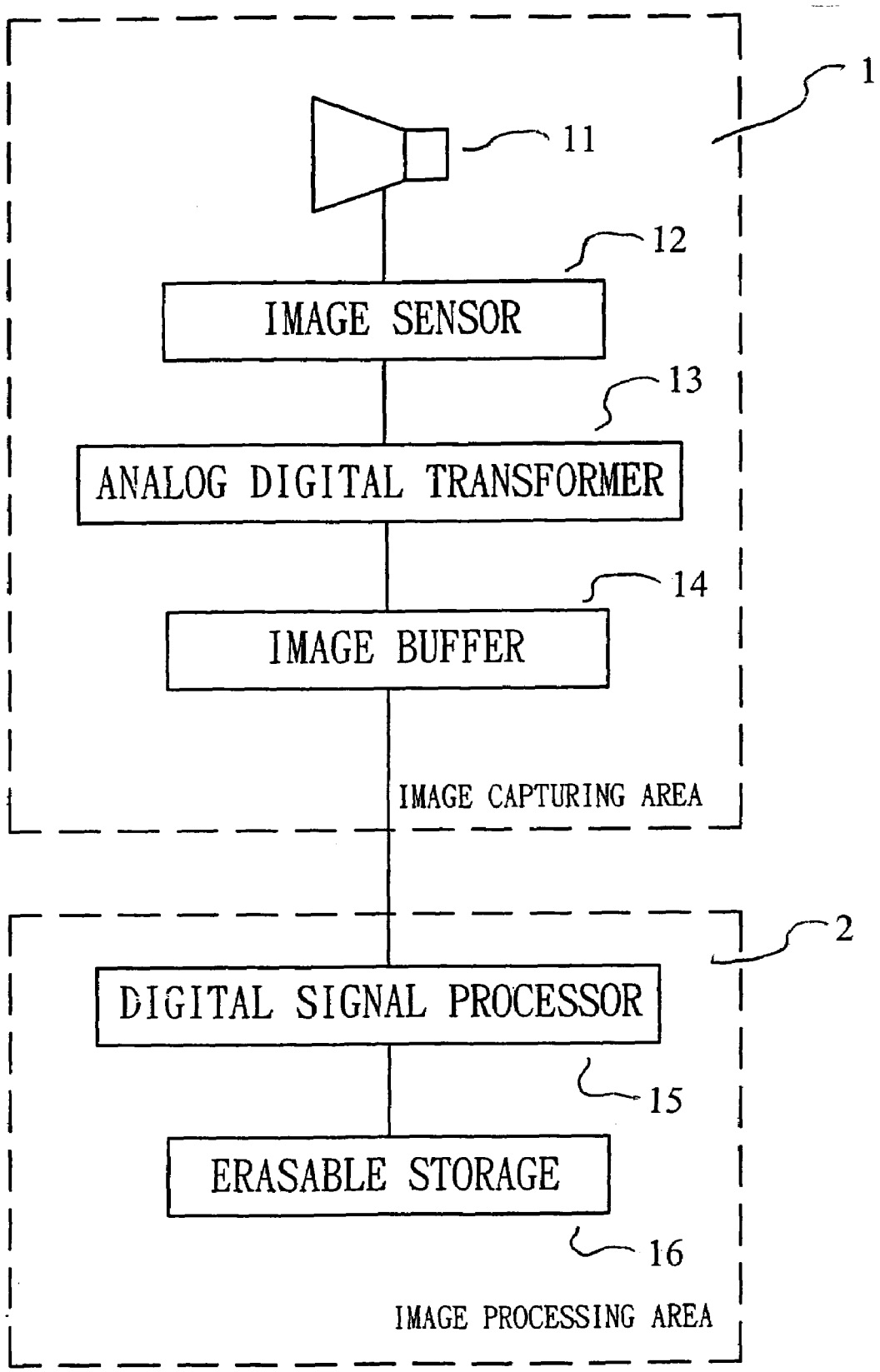
FIG. 2 is a block diagram of a preferred embodiment of the present invention, showing a circuit arrangement in the present invention.

The circuit used in the present invention is shown in FIG. 2. As FIG. 2 shown, the circuit consists of an image capturing section 1 and image processing section 2. The image capturing section 1 further comprises a CCD 11, an image sensor 12, an A/D converter 13 and an image buffer 14. The CCD His used to process an analog image color browse for an image. Then, the image sensor 12 receives the image pixel sensing current signal input from the CCD 11 and outputs a proper current signal to the A/D converter 13. Next, the A/D converter 13 transfers the analog current to a digital signal, and then the image buffer 14 will store the digital image data signal to provide for the next step image processing section 2 to process a proper pixel color algorithm compensation.

The image processing section 2 in FIG. 2 further comprises a digital signal processor 15 and erasable storage 16. First, the proper digital image data signal is input into the image processing section 2 after the image capturing executed in the image capturing section 1 is completed, and then a proper compensation is done on the pixel signal that needs to be compensated through the proper digital signal processing algorithm that is done by the digital signal processor 15 in coordination with the execution of the pixel compensation algorithm process of the present invention. After that, the compensated pixel signal is input into the erasable storage 16, which coordinates other circuit element units in the digital camera to display the compensated image in the best situation.

Figure 3:
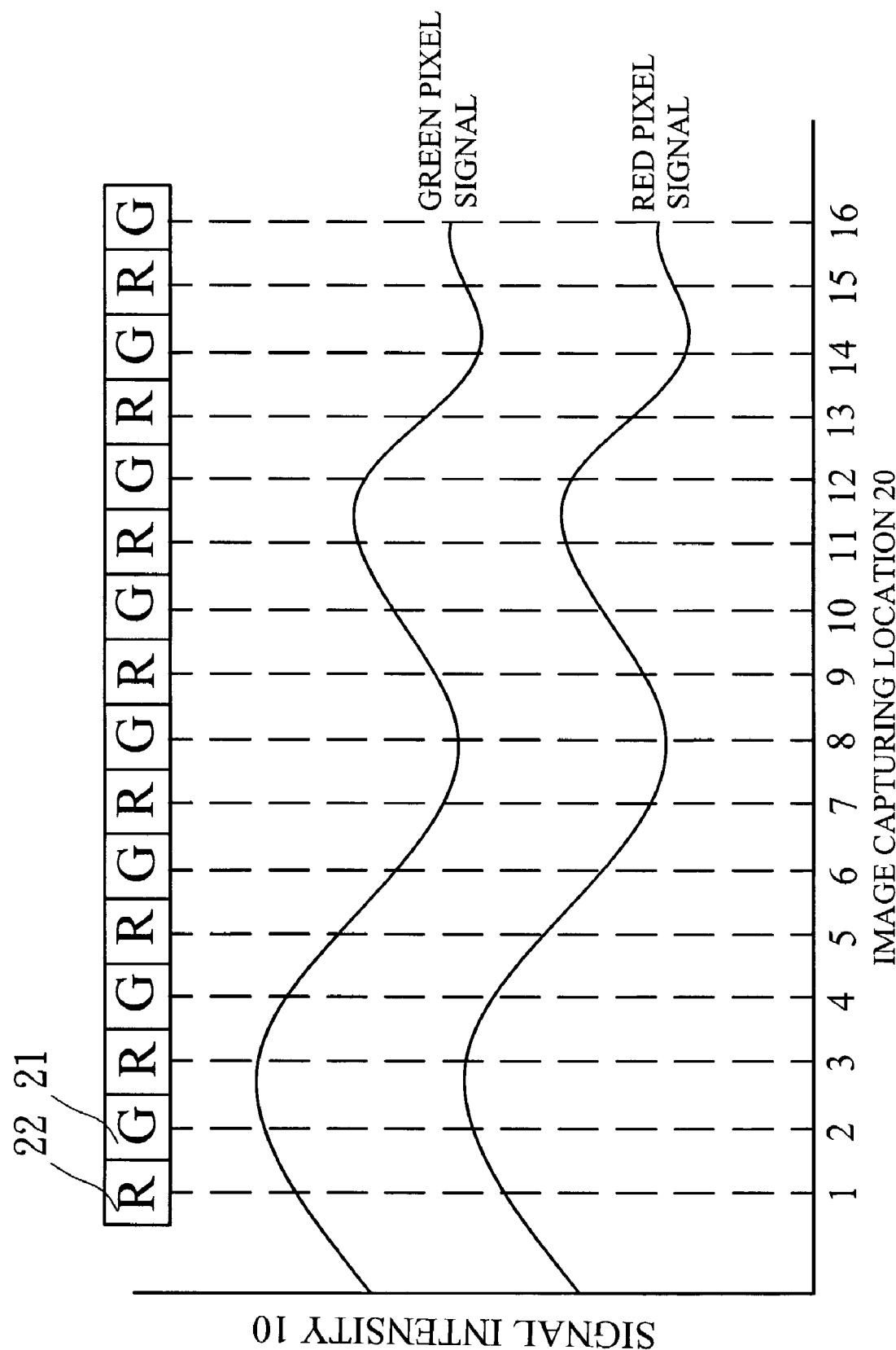
FIG. 3 is a schematic diagram of a preferred embodiment of the present invention, showing signal strength relative to a location of captured image.

Please refer to FIG. 3, FIG. 3 shows an analog signal capturing by pixels in any chosen horizontal or vertical direction in the CFA 100 used in the present invention, the vertical axis is a pixel signal intensity 10 and horizontal axis is image capturing location 20. As an example, the signal strength of the green pixel 21 (G) and red pixel 22 (R) are shown in FIG. 3, it is obvious that the signal intensity 10 of each pixel captured at a different image capturing location 20 is also different.

Figure 4:
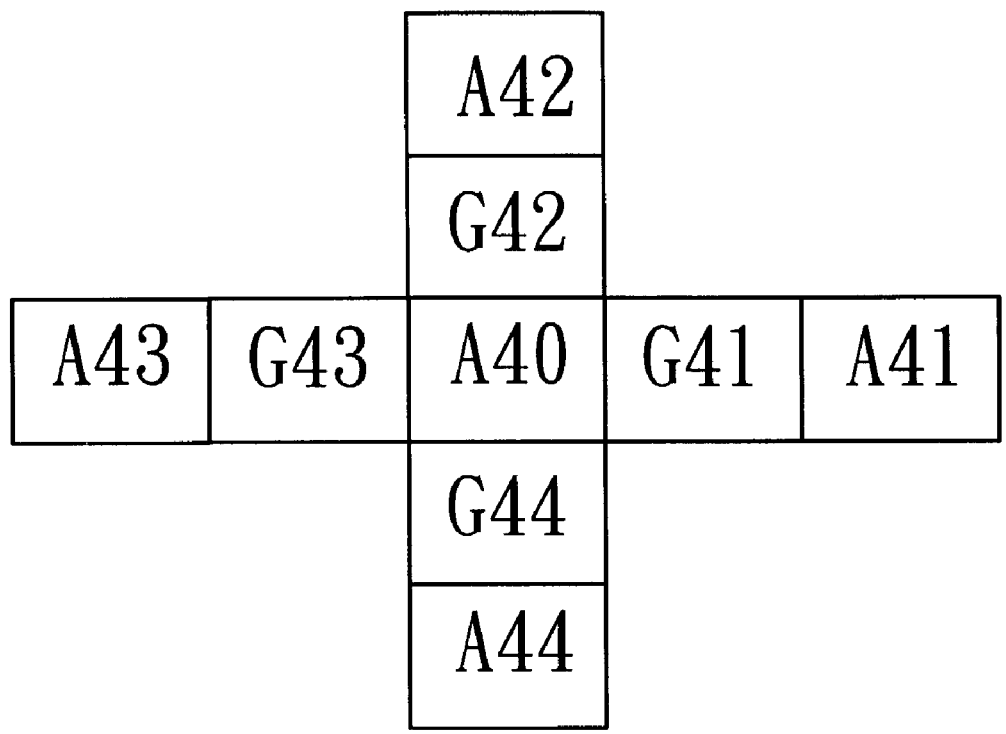
FIG. 4 is a schematic diagram of a preferred embodiment of the present invention.

Referring to FIG. 4, FIG. 4 illustrates a model of first preferred embodiment of the present invention. It includes a pixel A40 in the preferred embodiment; the pixel A40 is a pixel element that we want to execute the pixel compensation process in the embodiment. The digital image pixel data needed for the digital signal processor 15 in the circuit must include the digital image data signal of the compositions of other pixels G41, G43, G42 and G44 that are closely adjacent to the pixel A40 horizontally and vertically respectively and the same color pixels A41, A43, A42 and A44 next to the pixels G41, G43, G42 and G44 horizontally and vertically.

The proper color component compensation algorithm process is done for the digital data signals of the pixel A40 and its adjacent neighborhood pixels G41, G43, G42, G44, A41, A43, A42 and A44 through the image processing section 2 after they are obtained by the image capturing section 1, a horizontal green pixel color difference factor (GHd) and a vertical green pixel color difference factor (GVd) are provided to the digital signal processor 15 to be a judgment factor of a proper work execution rule during the process. Wherein, the horizontal green pixel color difference factor (GHd) and the vertical green pixel color difference factor (GVd) can be expressed as following:

$$GHd = |G41 - G43| + \frac{|2 \times A40 - (A41 + A43)|}{4}$$

$$GVd = |G42 - G44| + \frac{|2 \times A40 - (A42 + A44)|}{4}$$

The pixel compensation work executed by the image processing section 2 to the first embodiment must further consist of some factors that include a horizontal green compensation value (GH), a vertical green compensation value (GV) and a pixel compensation value (GA), being expressed respectively as following:

$$GH = \frac{(G41 + G43)}{2} + \frac{|2 \times A40 - (A41 + A43)|}{4}$$

$$GV = \frac{(G42 + G44)}{2} + \frac{|2 \times A40 - (A42 + A44)|}{4}$$

$$GA = (G41 + G42 + G43 + G44)/4$$

Let the above-mentioned horizontal green pixel color difference, vertical green pixel color difference, horizontal compensation value, vertical green compensation value and pixel compensation value to be in coordination with proper algorithm execution rules, which include:

(A) if said vertical green pixel color difference is smaller than or equal to a lowly set value and said horizontal green pixel color difference is also smaller than or equal to said lowly set value, said green pixel value of said pixel compensated by said image processing section is said pixel compensation value;

(B) if said vertical green pixel color difference is smaller than said horizontal green pixel color difference, said green pixel of the pixel is said horizontal green compensation value; and (C) if said horizontal green pixel color difference is smaller than said vertical green pixel color difference, said green pixel value of said pixel is said vertical green compensation value.

And through this, we can do the best pixel compensation work to the pixel that needs to be compensated.

Figure 5:
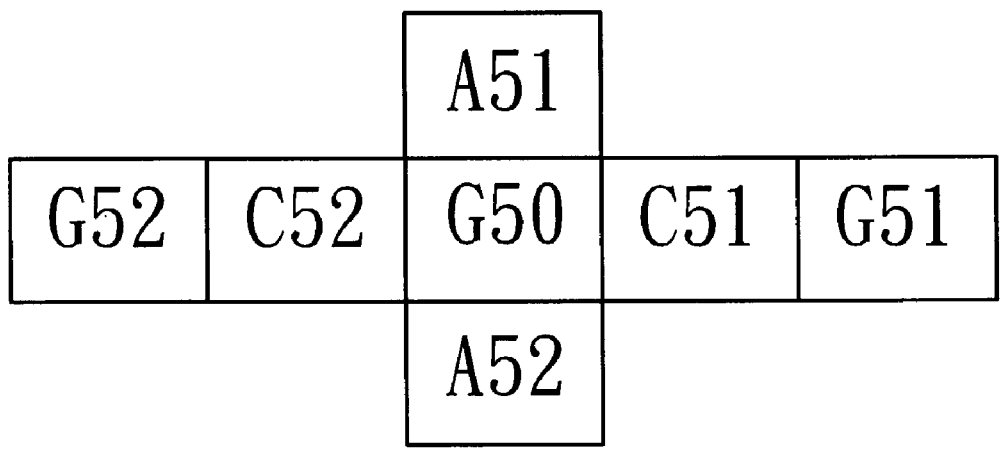
FIG. 5 is a schematic diagram of another preferred embodiment of the present invention.
Figure 6:
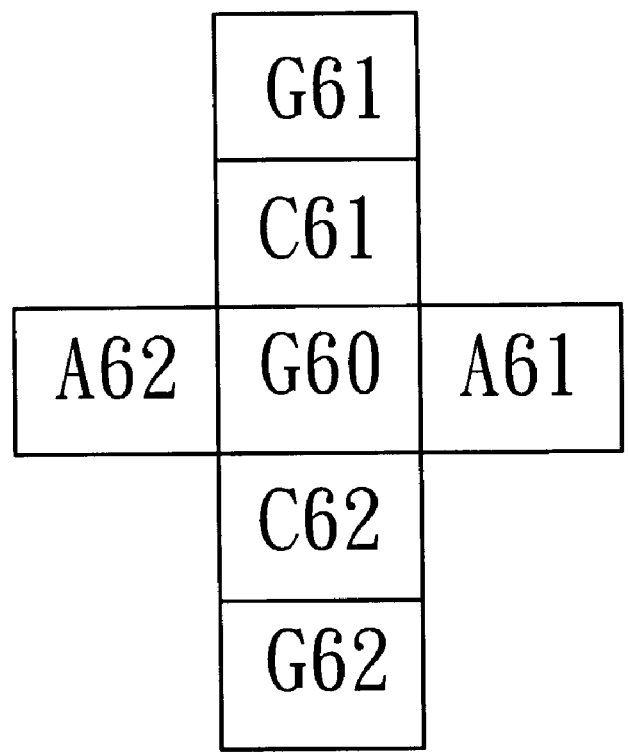
FIG. 6 is a schematic diagram of still another preferred embodiment of the present invention.

Now, please refer to FIG. 5 and FIG. 6, the figures show the second and third embodiments of the present invention, the difference between two embodiments is that the second embodiment stresses more on horizontal adjacent pixel components, but the third embodiment stresses more on vertical adjacent pixel components. However, the algorithm processes for both are same as the first embodiment; all must consider which pixel needs to be compensated and how to obtain the best compensation value to do the best pixel compensation work to the pixel through the proper algorithm on the adjacent pixel components.

Here, the horizontal pixels part is considered by the second embodiment in FIG. 5. Continuing to use the above-mentioned algorithm process mode executed in the first embodiment, the horizontal green pixel color difference needed in the second embodiment is $$GHd = |C51 - C52| + \frac{|2 \times G50 - (G51 + G52)|}{4},$$

and the horizontal pixel compensation value is $$GH = \frac{(C51 + C52)}{2} + \frac{|2 \times G50 - (G51 + G52)|}{4},$$

then, the pixel compensation value is GA=(A51+A52+C51+C52)/4. The vertical pixels part is considered by the third embodiment in FIG. 6, the horizontal green pixel color difference needed in the third embodiment is $$GVd = |C61 - C62| + \frac{|2 \times G60 - (G61 + G62)|}{4},$$

and the horizontal pixel compensation value is $$GV = \frac{(C61 + C62)}{2} + \frac{|2 \times G60 - (G61 + G62)|}{4},$$

then, the pixel compensation value is GA=(A61+A62+C61+C62)/4. The above-mentioned parameters are needed in the corresponding pixel compensation work executed by image processing section 2 in the second and third embodiments of the present invention. However, the compensation effect obtained from the pixel compensation algorithm mode utilized in the second and third embodiments is not the technical key point of the present invention owing to the deficiency of the reference condition. But, we still can use such kind of the algorithm way to reach the aim of the pixel compensation work under a particular situation.

Figure 7:
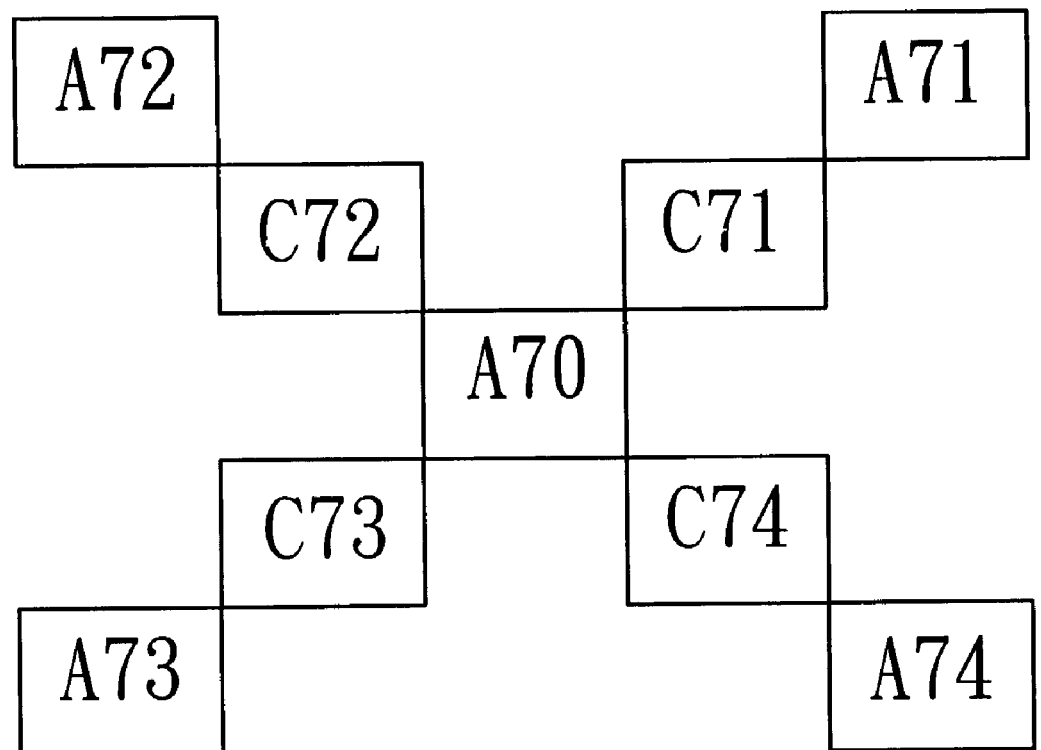
FIG. 7 is a schematic diagram of still, still another preferred embodiment of the present invention.

Moreover, the present invention further provides another embodiment in order to obtain a much more processing effect in the pixel compensation work of the present invention. Please refer to FIG. 7; FIG. 7 is the fourth embodiment of the present invention. Similarly, we still need corresponding work execution parameters in the fourth embodiment for us to do the algorithm. The process and storage of image digital signals must be done through the image capturing section 1 before needed parameters are obtained. A particular arrangement for the captured image digital signals is shown in FIG. 7, the arrangement includes a pixel A70 at the center and other four different color pixels C71, C72, C73 and C74 close adjacent to it diagonally respectively at upper right, upper left, lower left and lower right positions and more other four same color pixels A71, A72, A73 and A74 next to the pixels C71, C72, C73 and C74 respectively at upper right, upper left, lower left and lower right positions.

Here, we can obtain the parameters of a first pixel compensation color difference Ddd1 and second pixel compensation color difference Ddd2, the first and second pixel compensation color difference can be expressed respectively as:

$$Ddd1 = |C71 - C73| + \frac{|2 \times A70 - (A71 + A73)|}{4}$$

$$Ddd2 = |C72 - C74| + \frac{|2 \times A70 - (A72 + A74)|}{4}$$

In addition, we can also obtain the parameters of the first color compensation value Cdd1, second color compensation value Cdd2 and color compensation value CA, and they can be expressed respectively as:

$$Cdd1 = \frac{(C71 + C73)}{2} + \frac{|2 \times A70 - (A71 + A73)|}{4}$$

$$Cdd2 = \frac{(C72 + C74)}{2} + \frac{|2 \times A70 - (A72 + A74)|}{4}$$

$$CA = (C71 + C72 + C73 + C74)/4$$

Let the above-mentioned first pixel compensation color difference, second pixel compensation color difference, first color compensation value, second color compensation value and color compensation value to be in coordination with proper algorithm execution rules, which include:

(A) if the first pixel compensation color difference is smaller than or equal to a lowly set value and the second compensation pixel color difference is also smaller than or equal to the lowly set threshold value, the pixel compensation value of the pixel compensated by the image processing section is the color compensation value;

(B) if the first pixel compensation color difference is smaller than the second pixel compensation color difference, the pixel compensation value of the pixel is the first color compensation value; otherwise, (C) if the second pixel compensation color difference is smaller than the first pixel compensation color difference, the pixel compensation value of the pixel is the second color compensation value.

And through this, we can do the best pixel compensation work to the pixel that needs to be compensated.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments that do not depart from the spirit and scope of the invention

What is claimed is:

1. A processing method of image compensation for a digital camera, used to complete an image process work by means of a color compensation method executed in an image processing section; wherein said color compensation method comprises:

measuring a plurality of basic color components constructed of a pixel and a plurality of pixels adjacent thereto;

executing a pixel compensation algorithm to obtain a quantity of basic colors needed for a pixel whose colors need to be compensated through a plurality of basic colors constructed of said pixel and said pixels adjacent thereto;

processing a basic colors compensation work to said pixel whose colors need to be compensated through a digital signal processor installed in said image processing section, wherein said adjacent pixels are green pixels (G41, G43, G42 and G44) horizontally and vertically closely adjacent to one of said pixel (A40) and same color pixels (A41, A43, A42 and A44) respectively next to said green pixels (G41, G43, G42, G44), and wherein when said digital signal processor executes said color compensation work, parameters of a horizontal green pixel color difference GHd, vertical green pixel color difference GVd, horizontal green compensation value GH, vertical green compensation value GV and pixel compensation value GA are further used to execute a parameter algorithm, and said pixel compensation of said pixel is processed by means of the following rule:

if said vertical green pixel color difference is smaller than or equal to a lowly set value and said horizontal green pixel color difference is also smaller than or equal to said lowly set value, said green pixel value of said pixel compensated by said image processing section is said pixel compensation value, and if said vertical green pixel color difference is smaller than said horizontal green pixel color difference, said green pixel of the pixel is said horizontal green compensation value.

2. The processing method of claim 1, wherein said GHd is expressed as:

$$GHd = |G41 - G43| + \frac{|2 \times A40 - (A41 + A43)|}{4}.$$

3. The processing method of claim 1, wherein said GVd is expressed as:

$$GVd = |G42 - G44| + \frac{|2 \times A40 - (A42 + A44)|}{4}.$$

4. The processing method of claim 1, wherein said GH is expressed as:

$$GH = |G41 + G44| + \frac{|2 \times A40 - (A41 + A43)|}{4}.$$

5. The processing method of claim 1, wherein said GV is expressed as:

$$GV = |G42 + G44| + \frac{|2 \times A40 - (A42 + A44)|}{4}.$$

6. The processing method of claim 1, wherein said GA is expressed as:

$$GA = (G41 + G42 + G43 + G44)/4.$$

7. A processing method of image compensation for a digital camera, used to complete an image process work by means of a color compensation method executed in an image processing section; wherein said color compensation method comprises:

measuring a plurality of basic color components constructed of a pixel and a plurality of pixels adjacent thereto;

executing a pixel compensation algorithm to obtain a quantity of basic colors needed for a pixel whose colors need to be compensated through a plurality of basic colors constructed of said pixel and said pixels adjacent thereto;

processing a basic colors compensation work to said pixel whose colors need to be compensated through a digital signal processor installed in said image processing section wherein said adjacent pixels are four different color pixels C71, C72, C73 and C74 closely adjacent to a pixel A70 diagonally at respective upper right, upper left, lower left and lower right positions and additional four same color pixels A71, A72, A73 and A74 next to said pixels C71, C72, C73 and C74 at respective upper right, upper left, lower left and lower right positions, and wherein when said digital signal processor executes said color compensation work, parameters of a first pixel compensation color difference Ddd1, second pixel compensation color difference Ddd2, first color difference compensation value Cdd1, second color difference compensation value Cdd2 and color compensation value CA are further used to execute a parameter algorithm, and said pixel compensation of said pixel is processed by means of the following rule:

if said first pixel compensation color difference is smaller than or equal to a lowly set value and said second compensation pixel color difference is also smaller than or equal to the lowly set value, said pixel compensation value of said pixel compensated by the image processing section is the color compensation value, and if said first pixel compensation color difference is smaller than said second pixel compensation color difference, said pixel compensation value of the pixel is said first color compensation value.

8. The processing method of claim 7, wherein said first pixel compensation color difference Ddd1 is expressed as:

$$Ddd1 = |C71 - C73| + \frac{|2 \times A70 - (A71 + A73)|}{4}.$$

9. The processing method of claim 7, wherein said second pixel compensation color difference Ddd2 is expressed as:

$$Ddd2 = |C72 - C74| + \frac{|2 \times A70 - (A72 + A74)|}{4}.$$

10. The processing method of claim 7, wherein said first color difference compensation value Cdd1 is expressed as:

$$Cdd1 = \frac{(C71 + C73)}{2} + \frac{|2 \times A70 - (A71 + A73)|}{4}.$$

11. The processing method of claim 7, wherein said second color difference compensation value Cdd2 is expressed as:

$$Cdd2 = \frac{(C72 + C74)}{2} + \frac{|2 \times A70 - (A72 + A74)|}{4}.$$

12. The processing method of claim 7, wherein said color difference compensation value CA is expressed as:

$$CA = (C71 + C72 + C73 + C74)/4.$$

13. A processing method of image compensation for a digital camera, used to capture and process an image by means of circuit units of an image capturing section and image processing section, and further differentiating color construction components of said pixel through an application of a color filter array (CFA); capturing and measuring basic color components of said pixel and a plurality of pixels adjacent thereto, an algorithm process being executed by a digital signal processor installed in said image processing section to obtain parameters of a horizontal green pixel color difference GHd, vertical green pixel color difference GVd, horizontal green compensation value GH, vertical green compensation value GV and pixel compensation value GA, and said pixel compensation of said pixel is processed by means of the following rule:

if said vertical green pixel color difference is smaller than or equal to a lowly set value and said horizontal green pixel color difference is also smaller than or equal to said lowly set value, said green pixel value of said pixel compensated by said image processing section is said pixel compensation value;

if said vertical green pixel color difference is smaller than said horizontal green pixel color difference, said green pixel of the pixel is said horizontal green compensation value; and if said horizontal green pixel color difference is smaller than said vertical green pixel color difference, said green pixel value of said pixel is said vertical green compensation value.

14. The processing method of claim 13, wherein said adjacent pixels are green pixels (G41, G43, G42 and G44) horizontally and vertically closely adjacent to one of said pixel (A40) and same color pixels (A41, A43, A42 and A44) respectively next to said green pixels (G41, G43, G42, G44).

15. The processing method of claim 14, wherein said GHd is expressed as:

$$GHd = |G41 - G43| + \frac{|2 \times A40 - (A41 + A43)|}{4}.$$

16. The processing method of claim 14, wherein said GVd is expressed as:

$$GVd = |G42 - G44| + \frac{|2 \times A40 - (A42 + A44)|}{4}.$$

17. The processing method of claim 14, wherein said GH is expressed as:

$$GVd = |G42 - G44| + \frac{|2 \times A40 - (A41 + A43)|}{4}.$$

18. The processing method of claim 14, wherein said GV is expressed as:

$$GV = |G42 + G44| + \frac{|2 \times A40 - (A42 + A44)|}{4}.$$

19. The processing method of claim 14, wherein said GA is expressed as:

$$GA = (G41 + G42 + G43 + G44)/4.$$

20. A processing method of image compensation for a digital camera, used to capture and process an image by means of circuit units of an image capturing section and image processing section, and further differentiating color construction components of said pixel through an application of a color filter array (CFA); capturing and measuring basic color components of said pixel and a plurality of pixels adjacent thereto, an algorithm process being executed by a digital signal processor installed in said image processing section to obtain parameters of a first pixel compensation color difference Ddd1, second pixel compensation color difference Ddd2, first color difference compensation value Cdd1, second color difference compensation value Cdd2 and color compensation value CA, and said pixel compensation of said pixel is processed by means of the following rule:
- if said first pixel compensation color difference is smaller than or equal to a lowly set value and said second compensation pixel color difference is also smaller than or equal to the lowly set value, said pixel compensation value of said pixel compensated by the image processing section is the color compensation value;
- if said first pixel compensation color difference is smaller than said second pixel compensation color difference, said pixel compensation value of the pixel is said first color compensation value; and
- if said second pixel compensation color difference is smaller than said first pixel compensation color difference, said pixel compensation value of said pixel is said second color compensation value.

21. The processing method of claim 20, wherein said adjacent pixels are four different color pixels C71, C72, C73 and C74 closely adjacent to a pixel A70 diagonally at respective upper right, upper left, lower left and lower right positions and additional four same color pixels A71, A72, A73 and A74 next to said pixels C71, C72, C73 and C74 at respective upper right, upper left, lower left and lower right positions.

22. The processing method of claim 20, wherein said first pixel compensation color difference Ddd1 is expressed as:

$$Ddd1 = |C71 - C73| + \frac{|2 \times A70 - (A71 + A73)|}{4}.$$

23. The processing method of claim 20, wherein said second pixel compensation color difference Ddd2 is expressed as:

$$Ddd2 = |C72 - C74| + \frac{|2 \times A70 - (A72 + A74)|}{4}.$$

24. The processing method of claim 20, wherein said first color difference compensation value Cdd1 is expressed as:

$$Cdd1 = \frac{(C71 + C73)}{2} + \frac{|2 \times A70 - (A71 + A73)|}{4}.$$

25. The processing method of claim 20, wherein said second color difference compensation value Cdd2 is expressed as:

$$Cdd2 = \frac{(C72 + C74)}{2} + \frac{|2 \times A70 - (A72 + A74)|}{4}.$$

26. The processing method of claim 20, wherein said color difference compensation value CA is expressed as:

$$CA = (C71 + C72 + C73 + C74)/4.$$

27. A processing method of image compensation for a digital camera, used to complete an image process work by means of a color compensation method executed in an image processing section; wherein said color compensation method comprises:
- measuring a plurality of basic color components constructed by-of a pixel and a plurality of pixels adjacent thereto;
- executing a pixel compensation algorithm to obtain a quantity of basic colors needed for a pixel whose colors need to be compensated through a plurality of basic colors constructed of said pixel and said pixels adjacent thereto;
- processing a basic colors compensation work to said pixel whose colors need to be compensated through a digital signal processor installed in said image processing section, wherein said adjacent pixels are green pixels (G41, G43, G42 and G44) horizontally and vertically closely adjacent to one of said pixel (A40) and same color pixels (A41, A43, A42 and A44) respectively next to said green pixels (G41, G43, G42, G44), and
- wherein when said digital signal processor executes said color compensation work, parameters of a horizontal green pixel color difference GHd, vertical green pixel color difference GVd, horizontal green compensation value GH, vertical green compensation value GV and pixel compensation value GA are further used to execute a parameter algorithm, and said pixel compensation of said pixel is processed by means of the following rule:

if said vertical green pixel color difference is smaller than or equal to a lowly set value and said horizontal green pixel color difference is also smaller than or equal to said lowly set value, said green pixel value of said pixel compensated by said image processing section is said pixel compensation value, and if said horizontal green pixel color difference is smaller than said vertical green pixel color difference, said green pixel of said pixel is said vertical green compensation value.

28. The processing method of claim 27, wherein said GHd is expressed as:

$$GHd = |G41 - G43| + \frac{|2 \times A40 - (A41 + A43)|}{4}.$$

29. The processing method of claim 27, wherein said GVd is expressed as:

$$GVd = |G42 - G44| + \frac{|2 \times A40 - (A42 + A44)|}{4}.$$

30. The processing method of claim 27, wherein said GH is expressed as:

$$GVd = |G42 - G44| + \frac{|2 \times A40 - (A41 + A43)|}{4}.$$

31. The processing method of claim 27, wherein said GV is expressed as:

$$GV = |G42 + G44| + \frac{|2 \times A40 - (A42 + A44)|}{4}.$$

32. The processing method of claim 27, wherein said GA is expressed as:

$GA=(G41+G42+G43+G44)/4.$

33. A processing method of image compensation for a digital camera, used to complete an image process work by means of a color compensation method executed in an image processing section; wherein said color compensation method comprises:

measuring a plurality of basic color components constructed of a pixel and a plurality of pixels adjacent thereto;

executing a pixel compensation algorithm to obtain a quantity of basic colors needed for a pixel whose colon need to be compensated through a plurality of basic colors constructed of said pixel and said pixels adjacent thereto;

processing a basic colors compensation work to said pixel whose colors need to be compensated through a digital signal processor installed in said image processing section wherein said adjacent pixels are four different color pixels C71, C72, C73 and C74 closely adjacent to a pixel A70 diagonally at respective upper right, upper left, lower left and lower right positions and additional four same color pixels A71, A72, A73 and A74 next to said pixels C71, C72, C73 and C74 at respective upper right, upper left, lower left and lower right positions, and wherein when said digital signal processor executes said color compensation work, parameters of a first pixel compensation color difference Ddd1, second pixel compensation color difference Ddd2, first color difference compensation value Cdd1, second color difference compensation value Cdd2 and color compensation value CA are further used to execute a parameter algorithm, and said pixel compensation of said pixel is processed by means of the following rule:

if said first pixel compensation color difference is smaller than or equal to a lowly set value and said second compensation pixel color difference is also smaller than or equal to the lowly set value, said pixel compensation value of said pixel compensated by the image processing section is the color compensation value, and if said second pixel compensation color difference is smaller than said first pixel compensation color difference, said pixel compensation value of the pixel is said second color compensation value.

34. The processing method of claim 33, wherein said first pixel compensation color difference Ddd1 is expressed as:

$$Ddd1 = |C71 - C73| + \frac{|2 \times A70 - (A71 + A73)|}{4}.$$

35. The processing method of claim 33, wherein said second pixel compensation color difference Ddd2 is expressed as:

$$Ddd2 = |C72 - C74| + \frac{|2 \times A70 - (A72 + A74)|}{4}.$$

36. The processing method of claim 33, wherein said first color difference compensation value Cdd1 is expressed as:

$$Cdd1 = \frac{(C71 + C73)}{2} + \frac{|2 \times A70 - (A71 + A73)|}{4}.$$

37. The processing method of claim 33, wherein said second color difference compensation value Cdd2 is expressed as:

$$Cdd2 = \frac{(C72 + C74)}{2} + \frac{|2 \times A70 - (A72 + A74)|}{4}.$$

38. The processing method of claim 33, wherein said color difference compensation value CA is expressed as:

$CA=(C71+C72+C73+C74)/4.$

* * * * *